United States Patent Office 3,504,944
Patented Apr. 7, 1970

3,504,944
DEVICES FOR TENSIONING A CONVEYOR IN A MINERAL MINING INSTALLATION
Joachim Holz, Dortmund, and Horst Linke, Lunen, Germany, assignors to Gewerkschaft Eisenhutte Westfalia, Wethmar, near Lune, Westphalia, Germany, a body corporate of Germany
Filed Oct. 25, 1968, Ser. No. 770,685
Claims priority, application Germany, Apr. 26, 1968, 1,758,229
Int. Cl. E21c 29/02, 31/08
U.S. Cl. 299—32                                    11 Claims

ABSTRACT OF THE DISCLOSURE

A device in the form of a series of co-axially arranged piston and cylinder units for tensioning a conveyor in a mineral mining installation. The conveyor is of the conventional type having a plurality of channels with circulating scrapers driven by chains and its working position can be adjusted. The tensioning units are arranged parallel to the conveyor so as to be capable of tensioning the conveyor longitudinally. The units are effectively connected between the conveyor and a number of roof supporting chocks which are disposed alongside the conveyor over a zone extending near an end of the conveyor at which drive units are arranged, the chocks and conveyor are movable relatively to one another in a direction transversely of the latter by means of shifting rams.

BACKGROUND OF THE INVENTION

Longwall mineral face conveyors are well known in the mining art and are generally constructed from multiple sections with scrapers circulated by chains. Such conveyors usually serve as a guide for a mineral winning machine, such as a plough. The conveyor has one end i.e. the head end disposed in a mineral face working near the entrance to the working and usually this head end discharges won mineral into a roadway conveyor extending transversally of the longwall conveyor. The space around the mineral face entrance is usually constructed by the provision of drive units. It is known to excavate a part of the mineral face at the head end of the conveyor which is deeper than the remaining mineral face so that the width of the working is wider at this end of the working to accommodate the drive units and supports etc. This excavation can be accomplished by means of a "stall plough." The area of the working adjacent the roadway which accommodates the drive units and is somewhat wider than the remainder of the working is known, and will be referred to hereinafter as the "machine stall." The actual entrance between the working and the roadway is known as the "gate."

From time to time it is usually necessary to subject the head of the conveyor to tension in a direction longitudinally of the conveyor in order to brace the conveyor. For this purpose various devices have become known. The forces normally acting longitudinally of the conveyor when mineral is being won are the tension forces of the chains of the conveyor and possibly forces produced by a plough and also possibly a force produced by a component of the weight of the conveyor when the latter is inclined. These forces must all be counteracted from this to tune force by a bracing or tensioning exerted by the tensioning device on the driving head of the conveyor. The forces produced by the tensioning device can however only be controlled if the tension device can be supported with sufficient stability. The majority of the known tensioning devices are not able to be supported properly.

For example, a tensioning device is already known in which a beam, on which a supporting element is longitudinally displaceable, is rigidly connected with a machine frame in turn connected to the conveyor. The support element, the machine frame and the beam can be adjusted in position independently of one another. When tension devices of this kind are positioned on the goaf side or stowage side of the conveyor, however this leads to considerable difficulties, owing to the constricted space available, since the large drive unit for the conveyor and possibly for parts of a winning machine have to be accommodated in the same position. Since, moreover, the roof and the base of a mine working are usually considerably loosened and comparatively unstable in the zone of the mineral face entrance, additional difficulties are encountered in the tensioning of the conveyor since the tensioning device cannot be reliably anchored. The provision of a tensioning device in the "machine stall" that causes the difficulties mentioned above. Since the known devices do not enable sufficiently reliably tension to be obtained, a further proposal has been to locate the tensioning device for the coal face conveyor at the gate of the working. Which is at the actual entrance between the roadway and the working. This construction however, involves considerable additional outlay and furthermore, the tensioning device inevitably blocks the passage through the gate.

A further disadvantage is that in the installations employing the known devices the conveyor is passed out of the working and through an intermediate space formed between adjacent support assemblies disposed in the roadway. This means that when the conveyor is adjusted in its working position the roadway support frame situated in the path which the conveyor then happens to cover must be temporarily removed, involving considerable expenditure of labor and also proving a drawback from the point of view of safety.

The main object of the invention is to overcome the drawbacks of mineral mining installations having the known types of conveyor tensioning device.

A further object of the invention is to enable a drive unit for the conveyor, which unit is normally situated in the so-called "machine stall" to be combined in a space-saving manner with a tensioning for the conveyor so that the "machine stall" has comparatively moderate dimensions.

Another object of the invention is to provide an installation which has means for supportnig the machine stall over its entire length utilizing the known roof support chocks.

SUMMARY OF THE INVENTION

In or for an underground mineral mining installation which includes:

(a) A multi-channeled conveyor disposed alongside a mineral face and having circulatory scrapers for conveyor mineral in a longitudinal direction;

(b) Drive means for circulating the scrapers of the conveyor, said drive means being disposed on the side of the conveyor remote from the mineral face and adjacent one end of the conveyor;

(c) Roof support chocks disposed at the side of said conveyor remote from the mineral face and spaced over a zone adjacent said one end of the conveyor, each support chock having hydraulically-operated telescopic props, and (d) Shifting means operably connected between the conveyor and the support chocks for causing relative movement between the chocks and the conveyor in a direction transverselly of the latter;

the invention comprises an improved tensioning device for tensioning the conveyor channels in a direction longitudinally of the conveyor said device consists of a series of hydraulically-operated piston and cylinder units arranged co-axially of one another alongside the side of the conveyor remote from the mineral face, the relatively displaceable parts of each of said units being operably connected between the conveyor and one of said support chocks.

Further in accordance with the invention there is provided an underground mineral mining installation comprising a mineral conveyor disposed alongside a mineral face, a mineral winning plough disposed on the mineral face side of the conveyor and guided for movement therealong, a machine frame forming one end of the conveyor, means for driving the conveyor mounted on said frame, means for driving said plough mounted on said frame, a guide rail disposed on the mineral face side of the conveyor extending parallel thereto, a second plough guided on said guide rail for winning mineral in a zone adjacent said one end of the conveyor; said second plough being driven by said first plough, a tension beam extending parallel to the conveyor on the side remote from the mineral face, said beam being rigidly connected to said drive frame with the drive means for the plough and the conveyor disposed between the beam and the conveyor,, a plurality of roof support chocks each having telescopic props, said chocks being disposed on the side of the beam remote from the conveyor and a device for tensioning the conveyor in a longitudinal direction said device being connected to said beam and operably connected between the support chocks and the beam.

In accordance with this invention the force for tensioning the conveyor is supplied by a number of piston and cylinder units which are arranged in a series alongside the conveyor over as long a zone adjacent the end of the conveyor as desired. The force is applied between the support chocks disposed on the side of the conveyor remote from the mineral face and the conveyor itself. The support chocks can be of the normal kind employed in supporting other parts of the working and thus the specially constructed chocks hitherto necessary with known tensioning devices can be dispensed with.

With the tensioning device of this invention it is possible for the machnie frame to be constructed on the lines of a rigid grider to which the tension forces can be directly transmitted. It is of advantage, however, to adopt a version in which a tension beam is disposed alongside the conveyor and connected at a fixed angle with the machine frame. The beams could be T-shaped in cross section or box shaped so that the piston and cylinder units used for tensioning the conveyor can be housed in this beam the length of the tension beam depends on the number of units desired to be used. In any event the beam extends over at least a number of the support chocks.

According to a further feature of the invention a support beam or the like can be associated with each piston and cylinder unit. This beam can provide the connection between a piston and cylinder unit and its associated support chock. The support beams can be advantageously constructed to serve as guide rails on which the individual support chocks guide themselves when a shifting operation is undertaken. This shifting operation is preferably effected by means of hydraulic shifting rams which can act on the support beams. The support beams can be L-shaped in which case the associated piston and cylinder unit is coupled to one limb extending parallel to the conveyor while the other limb, extending perpendicularly to the conveyor forms the guide rail for guiding its associated support chock. If the use of such special L-shaped support beams is dispensed with, so that the piston and cylinder units are coupled with the conveyor directly then each support chock can contact the side of the conveyor through a support beam which at the same time serves as a guide rail for the chock units.

According to a further characteristic of the invention the afroementioned tension beam can be so positioned in relation to the conveyor, as to define a space between itself and the conveyor. This space can then accommodate the conveyor drive means and, if necessary, a plough drive means. The piston and cylinder units can be connected by articulated joints to the support chocks or to the shifting rams of the latter and these joints can be pivotable about an axis parallel to the longitudinal axis of the beam.

The tensioning device can be used with particular advantage with an installation of the type with which the "machine stall" is moved up mechanically by means of a "stall plough" of the known kind. In this case the machine stall can be made as long as desired, and this in its turn makes it possible for the beam to be made comparatively long so that a relatively large number of piston and cylinder units can be accommodated over the length of the beam. The machine frame can be connected to the conveyor with one or more connecting chutes so that the endless scraper chains of the conveyor can extend up from the last channel of the conveyor to the associated driving and reversing drum with a very small angle of ascent.

BRIEF DESCRIPTION OF DRAWINGS

Constructional embodiments of the invention will now be described, by way of examples only, with reference to the accompanying drawings, wherein.

DESCRIPTION OF PREFERRED EMBODIMENTS

Figure 2:
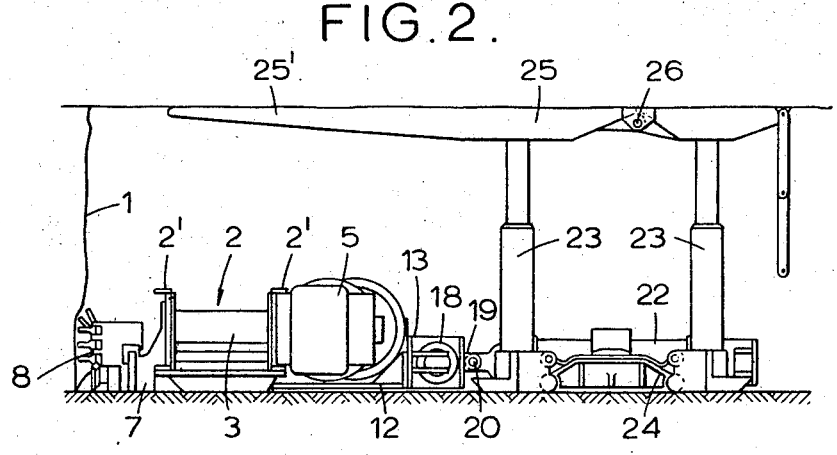
FIGURE 2 is a side view of the installation shown in FIGURE 1.
Figure 1:
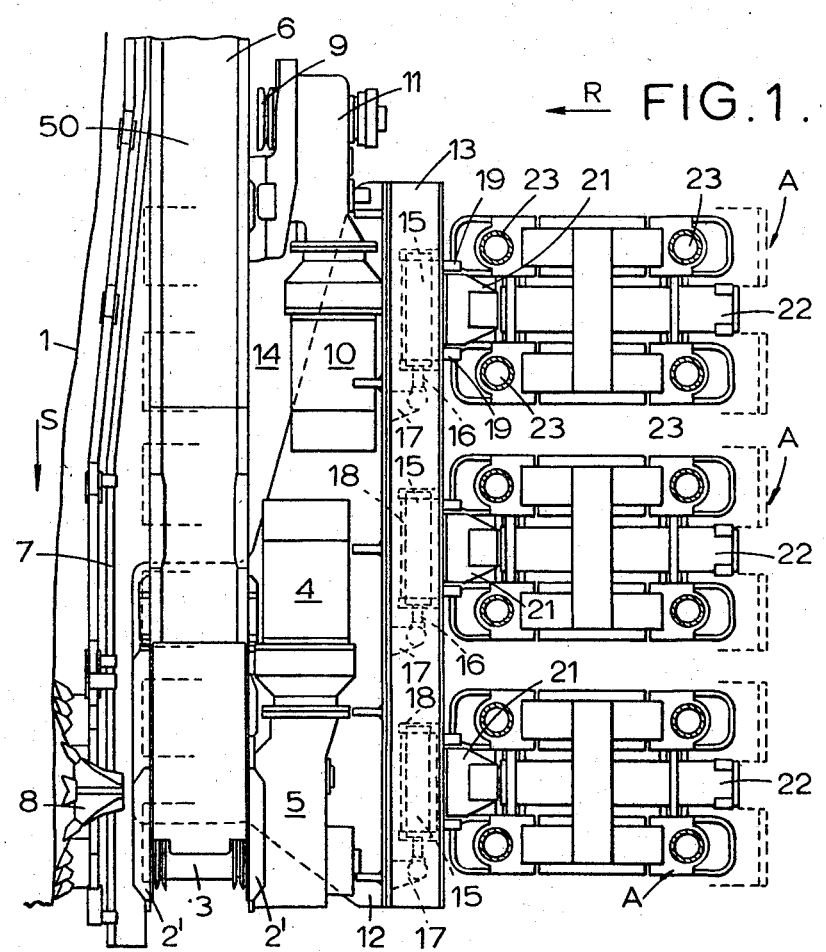
FIGURE 1 is a plan view of an installation showing the head end of a longwall coal face conveyor, situated in the zone of the coal face entrance, i.e. the "machine stall" and having a tensioning device of this invention.

As shown in FIGURES 1 and 2 a longwall coal face conveyor generally designated 50 is in the form of a double chain scraper conveyor which is arranged along a coal face 1, in a mine working. The head end of the conveyor 50 depicted in FIGURE 1 is adjacent the entrance to the coal face working, i.e. the so-called "machine stall" used and this end would normally be arranged adjacent a roadway conveyor (not shown) extending transversely of the conveyor 50 so that won coal is loaded from the conveyor 50 to the roadway conveyor. A machine frame 2 is rigidly attached to the conveyor 50 and the frame 2 has upright side plates 2' between which the driving drum 3 for the two endless scraper chains is disposed. The frame 2 carries a motor 4 and a gearbox 5 arranged on the side of the conveyor 50 remote from the coal face, i.e. the goaf side. The drum 3 is driven by the motor 4 via gearing carried in the gearbox 5. The output shaft from the motor 4 and the input shaft to the gearbox 5 are parallel to the longitudinal direction of the conveyor 50. The machine frame 2 is actually connected to the conveyor 50 via connecting chutes 6 which are connected to the channels of the conveyor. The machine frame 2 and the connecting chutes 6 are so designed that the scraper chains of the coal face conveyor proceed from last channel of the conveyor 50 to the driving drum 3 with a very low angle of ascent. This is advantageous but necessitates a comparatively great overall length for the machine frame 2 and the connecting chutes 6 and generally necessitates a relatively great length for the "machine stall." This is of course disadvantageous. As will become apparent hereinafter however these disadvantages are significantly reduced by the present invention and the advantage of having the scraper chains extending in the said manner far outway the disadvantages of a long machine stall.

On the coal face side of the conveyor 50 the machine frame 2 and the connecting chutes 6 are connected to a guide rail 7. A "stall plough" 8 of the known kind by means of which the "machine stall" is mechanically moved up, is guided on the guide rail 7. The stall plough 8 as is known, is driven by a main plough (not shown) which is driven along the conveyor 50 by a chain engaging a driving sprocket 9 carried on the goaf side of one of the connecting chutes 6. A drive motor 10 is connected to the sprocket 9 via gearing in a gearbox 11. The motor 10 and the gearbox 11 are disposed on the goaf side of the conveyor 50 with the axes of their output and input shafts parallel to the longitudinal axis of the conveyor 50.

A tension beam 13 is rigidly connected with the machine frame 2 via a stout baseplate 12. The distance between the tension beam 13 and the machine frame 2 and the connecting chutes 6 is approximately equal to the width of the drive arrangements 4, 5 and 10, 11 so that the drive arrangements 4, 5 and 10, 11 are accommodated in the space 14 between the conveyor 50 and the beam 13. The tension beam 13 extends over the entire length of the machine frame 2 and at least over part of the length of the connecting chute 6 connected thereto.

The tension beam 13 is hollow, being constructed as a box girder and contains a tensioning device in the form of three hydraulic tensioning piston and cylinder units 15 disposed in series and equally spaced from one another. The units 15 have double-acting pistons. Each unit 15 has a piston rod 16 connected rigidly to the beam 13 through a bracket 17 or similar element. The cylinders of the units 15 each engage S thrust member 18 which can be in the form of a housing for the units 15 having laterally projecting flanges 19 on which the cylinders abut. The flanges 19 are connected via a link 20 pivotable about a horizontal axis, to a coupling device 21 with which is connected a hydraulic shifting ram 22.

The shifting rams 22 in the form of cylinders each having a double-acting piston therein. The cylinder of each ram 22 is connected to a conventional roof support chock A. The rams 22 are used to shift the support chocks A and conveyor 50 relatively of one another in a direction towards the coal face 1. In known manner with the chocks in bracing the roof the rams 22 extend to move the conveyor 50 towards the coal face so that the ploughs can re-engage the coal face again after winning a certain quantity of coal. The chocks A can then be relieved successively and their rams 22 retracted to bring them up to the conveyor 50 again. As shown, three support chocks A are provided and serve to support the machine stall in the zone of the driving head of the conveyor 50.

Each support chock A consists of four hydraulic telescopic props 23, disposed at the corners of a square and the two props 23 are situated one behind the other as viewed in the direction of the coal face are interconnected at their lower parts by means of an articulated and/or resilient base connection 24 and at their upper parts by means of a bar 25 which consists of a number of sections inter-connected with links 26. As shown the bar 25 has a part 25′ extending towards the coal face and outwardly beyond the conveyor and into the extraction zone. One shifting ram 22 is disposed between the props 23 of chock A and the cylinder of the ram 22 is connected to a lower part of the chock A.

To enable the conveyor 50 to be subjected to tension in the direction shown by the arrows S in FIGURE 1 the units 15 are successively or simultaneously subjected to hydraulic pressure medium in such a way that their piston rods 16 are extended. The extension of the pitson rods 16 causes the beam 13 to be displaced relative to the chocks A and this thereby displaces the machine frame 2 by way of the baseplate 12 in the direction shown by the arrow S so that the conveyor 50 is subjected to tension in the required manner.

In this tensioning process the units 15 engage on the support chocks A via the parts 18, 19, 20, 21 and 22. If the conveyor 50 is to be shifted in the direction of the coal face then the shifting rams 22 are supplied with pressure medium so that the units 22 extend and exert a thrust force to displace the beam 13 and with it the machine frame 2, the drive arrangements and the conveyor 50 in the direction of the arrow R. Once these parts have been shifted up the props 23 of the chocks A can be relieved and pressure medium supplied to the units 22 to cause retraction thereof and move the chocks A to follow up the working progress.

It is possible for the supporting chocks A to be laterally aligned in respect of one another by means of the units 15 and in this case the tension beam 13 serves as a thrust member for the units 15.

It can be seen that with the arrangement as described the endmost support chocks A can be disposed near the front end of the conveyor 50 from where the coal is transferred to the roadway conveyor (not shown). As the machine stall is moved up mechanically by means of the stall plough 8 in known manner, it can be constructed with a relatively great length. This feature makes it possible for the machine frame 2 as well as the connecting chutes 6 by which it is connected to the conveyor 50 to be likewise made comparatively long, so that the endless scraper chains of the conveyor 50 to the driving drum 3 at a very low angle of ascent as mentioned previously.

Figure 3:
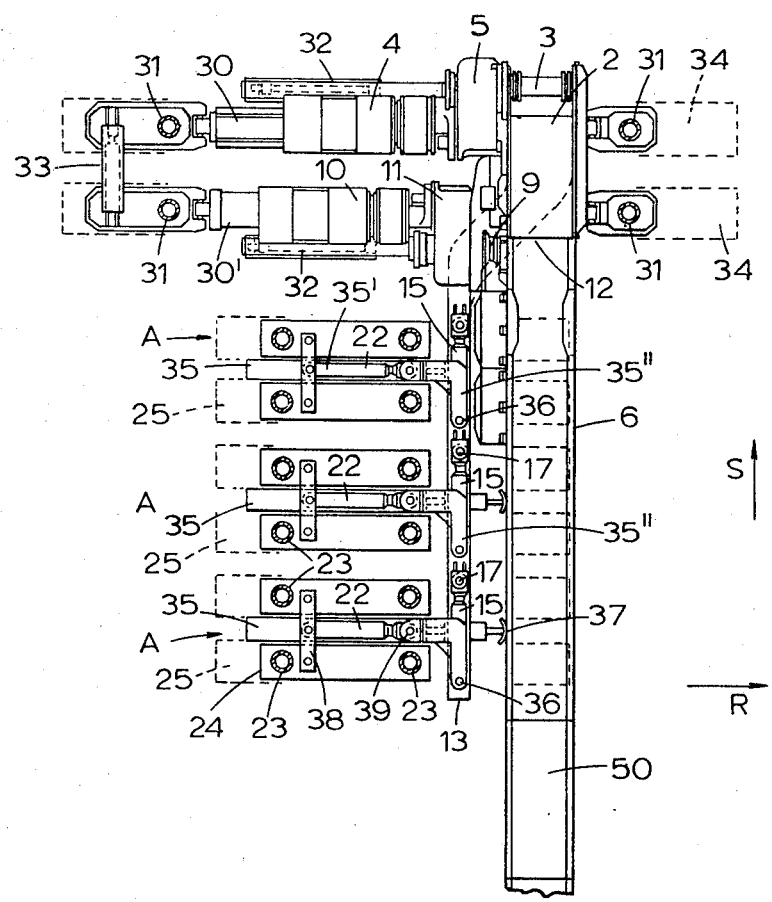
FIGURE 3 is a view of a further embodiment of this invention, the view corresponding to that of FIGURE 1.

In the embodiment shown in FIGURE 3 the parts which have already been described in connection with FIGURES 1 and 2 are designated with the same reference numerals as those used in FIGURES 1 and 2. As shown, the drive arrangement 4 and 5 for the coal face conveyor 50 is connected to the machine frame 2 in such a way that the output shaft from the motor 4 and the input shaft to the gearbox 5 extend perpendicularly to the longitudinal direction of the conveyor 50 unlike the same parts in the previously described embodiment. The drive arrangement 10 and 11 for the plough is disposed in a similar fashion by the side of the drive arrangement 4, 5. The driving head of the conveyor 50 rests on two tension beams 30 and 30′ arranged parallel to each other and extending transversely to the longitudinal direction of the conveyor 50. Each beam 30, 30′ is provided with two telescopic hydraulic props 31, which are disposed on either side of the conveyor 50 with which the beams 30, 30′ can be firmly clamped. The props 30, 30′ engage a common roof bar 34. A hydraulic shifting ram 32 is connected to the outside of each beam 30, 30′ and the piston rod of the ram 32 can either be connected to the conveyor 50 or to the gearbox 11 connected to the machine frame 2. The two beams 30, 30′ are interconnected via a hydraulic guiding piston and cylinder unit 33. Frames are formed by the beams 30, 30′ the props 31 and roof bars 34 and these frame together with the driving head of the conveyor 50 can be displaced independently of each other in the direction shown by the arrow R. If the frames are to be displaced in relation to the driving head then the props 31 are released and the shifting rams 32 are supplied with hydraulic pressure medium so that the cylinders of the units 32 will displace the frame in relation to the driving head of the conveyor 50 which thus forms a thrust-member for the units 32. When the position of the driving head is being adjusted the props 31 of the two frames are firmly clamped against the roof so that the frames now form the thrust member for the units 32 which are charged with pressure medium to displace the conveyor 50. The guide unit 33 is used to adjust the beams 30 and 30′ to the correct angular position in respect of each other in order to compensate for undesired changes of direction in the shifting movement of the conveyor 50. The machine frame 2 is slidably mounted on the beams 30 and 30′.

In similar fashion to the arrangement shown in FIGURES 1 and 2 the tensioning of the conveyor in the direction shown by the arrow S is produced by tensioning units 15 which are mounted in a series in the tension beam 13 and connected by their piston rods to the tension beam 13 at the point marked 17. The tension beam 13 is rigidly connected with the lower side of the machine frame 2 via a part 12 is situated at a short distance from the goaf side of the conveyor 50 and extends parallel to the latter. The units 15 in this embodiment are connected with the support chocks A via L-shaped supporting beams 35. One arm 35' of each supporting beam 35 is disposed between the pairs of props 23 of one of the support chocks A and forms a guide rail along which the support chock A guides itself in the course of its movement in the direction of displacement R. The other arm 35" of each beam 35 extends parallel to the conveyor and one of the units 15 is connected to the rear of the arm 35" via a link 36. The links 36 also serve to provide an articulated connection between the L-shaped supporting beams 35 and the tension beam 13. The beam 13 is fitted with abutment heads 37 or similar devices which rest against the side of the conveyor and are used to convey the displacement forces of the shifting rams 22 of the support chocks A to the conveyor 50.

The rear ends of the cylinders of the shifting rams 22 each rest against a transverse bar 38 attached to one of the support chocks A. Their actual piston rods of the rams 22 are each connected via a link 39 to the support beam 35.

If the props 23 of the support chocks A are set and the props 31 of the beams 30 and 30' released, then the conveyor 50 can be displaced in both directions as shown by the arrow S by successively or simultaneously subjecting the three tensioning units 15 to pressure medium. The support chocks A form a thrust member for the units 15 when these units 15 are supplied with pressure medium in order to subject the conveyor to tension, in the direction shown by the arrow S. The supporting forces of the units 15 are in this case transmitted via the supporting beams 35 to the support chocks A. It is also possible for the conveyor 50 to be displaced in relation to the support chocks A and likewise for the support chocks A to be displaced in relation to the conveyor 50 in the direction of working and in the manner of the first embodiment.

If the driving head of the conveyor 50 is displaced in the direction shown by the arrow R, then the shifting rams 22 of the support chocks A and the shifting rams 32 of the frames 30, 30', 31 and 34 are subjected to pressure in such a way that the piston rods are extended to move the driving head of the conveyor 50 relative to the support chocks A. The displacement forces of the rams 22 of the support chocks A are transmitted to the conveyor 50 via the support beams 35 the tension beam 13 and the heads 37. If the driving head of the conveyor 50 is moved by one step in the direction shown by the arrow R, in the manner described then the support chocks A can be caused to follow-up. This action is effected by pressure medium applied to the working chambers of the rams 22 on the piston rod side thereof.

As may be appreciated the arrangement described makes it possible for the units 15 to be directly connected with the conveyor 50 and the conveyor 50 so that the machine frame 2 together with connecting chute or chutes 6 then forms a rigid support therefore. In this case therefore the function of the beam 13 can be dispensed with.

We claim:

1. In an underground mining installation comprising a multi-channelled conveyor disposed alongside a mineral face and having circulatory scrapers for conveying mineral in a longitudinal direction; a machine frame forming an end of said conveyor; a drive means for the scrapers of the conveyor carried by said machine frame; roof support chocks disposed at the side of said conveyor remote from the mineral face and spaced over a zone adjacent said one end of the conveyor, each support chock having hydraulically-operated telescopic props; and shifting means operably connected between the conveyor and the support chocks for causing relative movement between the chocks and the conveyor in a direction transversely of the latter; an improved tensioning device for tensioning the conveyor channels in a direction longitudinally of the conveyor said device consists of a series of hydraulically-operated piston and cylinder units arranged longitudinally of the conveyor, the relatively displaceable parts of each of said units being operably connected between the conveyor and one of said support chocks.

2. An installation according to claim 1 wherein L-shaped suport beams are provided each having one limb extending parallel to the conveyor and attached to one of the piston and cylinder units and a further limb extending perpendicularly to the conveyor and attached to an associated support unit, and wherein the further limb forms a guide on which said support unit is slidably guided when moved.

3. An installation according to claim 1 wherein the piston and cylinder units are disposed within a hollow beam extending alongside the side of the conveyor remote from the mineral face and connected to the machine frame and the cylinders of said units are connected to the support chocks with links pivotable about an axis extending parallel to the conveyor.

4. An installation according to claim 1, further comprising a tension beam connected to the machine frame and extending along the side of the conveyor remote from the mineral face and parallel to the conveyor, the piston and cylinder units being disposed on said beam.

5. An installation according to claim 4, wherein the shifting means for the support units are in the form of hydraulic rams each with a cylinder connected to one of the units and a ram connected to one of said L-shaped support beams.

6. An installation according to claim 1, further comprising a tension beam connected to the machine frame and extending along the side of the conveyor remote from the mineral face and parallel to the conveyor, the piston and cylinder units being disposed in said beam.

7. An installation according to claim 6 wherein the hollow beam 13 is disposed at such a distance from the conveyor that a space is formed therebetween in which the drive for the conveyor is disposed.

8. An installation according to claim 7 further comprising a mineral detaching plough guided along the mineral face side of the conveyor and means for driving said plough disposed in the space between the hollow beam and the conveyor.

9. An underground mineral mining installation comprising a mineral conveyor disposed alongside a mineral face, a mineral winning plough disposed on the mineral face side of the conveyor and guided for movement therealong, a machine frame forming one end of said conveyor, means for driving the conveyor mounted on said frame, means for driving said plough mounted on said frame, a guide rail disposed on the mineral face side of the conveyor extending parallel thereto, a second plough guided on said guide rail for winning mineral in a zone adjacent said one end of the conveyor; said second plough being driven by said first plough, a tension beam extending parallel to the conveyor on the side remote from the mineral face, said beam being rigidly connected to said drive frame with the drive means for the pluogh and the conveyor disposed between the beam and the conveyor, a plurality of roof support chocks each having telescopic props, said chocks being disposed on the side of the beam remote from the conveyor and a device for tensioning the conveyor in a longitudinal direction said device being connected to said beam and operably connected between the support chocks and the beam.

10. An installation according to claim 9 wherein the tensioning device is in the form of a series of hydraulic piston and cylinder units arranged in a co-axial manner and there is further provided means for shifting the chocks and the conveyor relative to one another in a direction perpendicularly of the longitudinal direction of the conveyor.

11. In or for an underground mining installation which includes:
 (a) a multi-channelled conveyor disposed alongside a mineral face and having circulatory scrapers for conveyor mineral in a longitudinal direction;
 (b) drive means for circulating the scrapers of the conveyor, said drive means being disposed on the side of the conveyor remote from the mineral face and adjacent one end of the conveyor;
 (c) roof support chocks disposed at the side of said conveyor remote from the mineral face and spaced over a zone adjacent said one end of the conveyor, each support chock having hydraulically-operated telescopic props; and
 (d) shifting means operably connected between the conveyor and the support chocks for causing relative movement between the chocks and the conveyor in a direction transversely of the latter;
a device for tensioning the conveyor in a longitudinal direction, said device comprising a plurality of piston and cylinder units each with its longitudinal axis extending parallel to the conveyor on the side thereof remote from the mineral face, said units each being operably connected to one of the support chocks and to the conveyor.

References Cited

UNITED STATES PATENTS

| | | | |
|---|---|---|---|
| 2,990,168 | 6/1961 | Meninghaus | 198—126 X |
| 3,072,241 | 1/1963 | Rosenberg et al. | 299—32 X |
| 3,113,661 | 12/1963 | Linke et al. | 198—126 |
| 3,447,328 | 6/1969 | Schuermann | 61—45.2 |

FOREIGN PATENTS

| | | |
|---|---|---|
| 1,065,101 | 4/1967 | Great Britain. |
| 1,074,135 | 6/1967 | Great Britain. |

ERNEST R. PURSER, Primary Examiner

U.S. Cl. X.R.

198—126; 299—43, 34